Dec. 1, 1931.  W. A. BRUNO  1,834,896
RHEOSTAT AND POTENTIOMETER
Filed Oct. 1, 1930

INVENTOR
William A. Bruno
BY
ATTORNEYS

Patented Dec. 1, 1931

1,834,896

UNITED STATES PATENT OFFICE

WILLIAM A. BRUNO, OF NEW YORK, N. Y., ASSIGNOR TO CLAROSTAT MFG. CO., INC., OF BROOKLYN, NEW YORK, A CORPORATION OF NEW YORK

RHEOSTAT AND POTENTIOMETER

Application filed October 1, 1930. Serial No. 485,769.

This invention relates to rheostats and potentiometers and has for an object to provide an improved device in which the friction between the engaging portions of the contacts is eliminated.

Another object of the invention is to provide an improved device to cause electrical contacts between a movable arm and a resistance element which are at all times in contact with each other, and still not cause any abrasion between the contact and the resistance element.

A further object, more specifically, is to provide an improved rheostat and potentiometer which may have a wire-wound resistance, a carbon resistance, or a resistance of any kind in connection with a rolling contact positively rotated through the action of a rack and gear, so that friction between the contact surfaces will be eliminated.

In the accompanying drawings—

Figure 1:
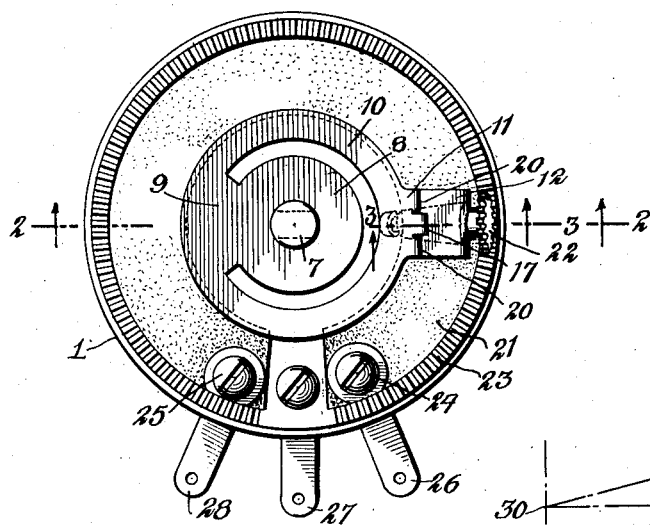
Figure 1 is a top plan view of a rheostat and potentiometer disclosing an embodiment of the invention.

Referring to the accompanying drawings by numerals 1 indicates a body of bakelite, rubber or other insulating material which carries a sleeve 2 held in place by the enlargement 3 and the clamping nut 4. A large shaft 5 extends through the sleeve 2, said control shaft having a shoulder 6 at one end, while the opposite end has a turned over portion or upset portion 7 whereby the comparatively thin plate 8 is riveted or clamped in place. This plate merges through the neck 9 into a resilient ring member 10 which is provided with an arm 11 connected through a bearing member 12 to the contact roller 13.

Figure 3:
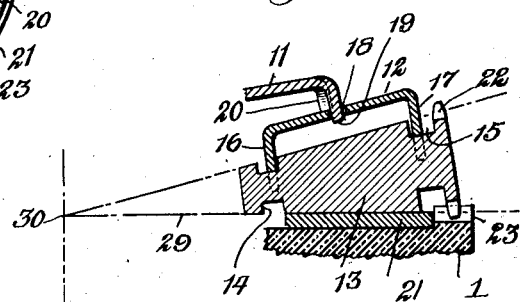
Figure 3 is an enlarged fragmentary sectional view through Figure 1 on the line 3—3.
Figure 2:
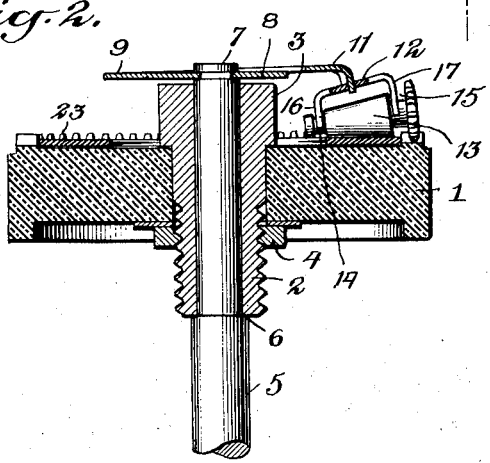
Figure 2 is a sectional view through Figure 1, approximately on the line 2—2.

Contact roller 13, as shown in Figure 3, is preferably solid and is preferably made of metal or some other good conductor. The roller 13 is provided with an annular groove 14 and also an annular groove 15, said groove accommodating the ends 16 and 17 of the bearing member 12, said ends having notched portions straddling the reduced portion of the contact roller 13. Bearing member 12 is provided with an aperture 18 in which a tongue or projecting portion 19 of arm 11 extends. The arm 11 is also provided with a pair of depending fingers 20 resting on the upper surface of the bearing member 12 so as to hold the extension 19 in place, and also to cause the bearing member to press against the contact roller 13, and in turn cause the contact roller to bear against the resistance element 21.

Resistance element 21 is shown as carbon but it is evident that it could be a resistance element of any desired type. The arrangement of plate 8, neck 9 and ring 10 is such that arm 11 resiliently presses bearing 12 and associated parts, whereby there is always a good contact between roller 13 and resistance element 21.

From the drawings it will be seen that the roller 21 at its outer end is provided with a gear wheel 22 meshing with the rack 23, which rack is shown integral with the body 1, although it can be made separate and rigidly secured thereto.

When the device operates the screws 24 and 25 act as stops for limiting the rotary movement of the resilient ring 10, roller 13 and associated parts. It will also be noted from Figure 1 that suitable terminals 26 and 27 and 28 are provided so that the device may be used at any time as a rheostat or as a potentiometer. From the dot-and-dash lines 29 in Figure 3 it will be seen that the upper surface of the resistance element 21 is in line with point 30, and that the axis of the roller 13 is also in line with point 30. The same is true with respect to the gear wheel 22 and the rack 23. By reason of this fact there can be no sliding and, consequently, no abrasion between the contact roller 13, and resistance element 21, as the gear wheel 22 acting on the rack 23 positively rotates the roller 13.

By reason of the positive rotation through the action of gear wheel 22 the roller 13 is not rotated by reason of the friction between roller 13 and element 21, whereby abrasion from any sliding or slipping action is eliminated. This produces a better, smoother and more uniform contact at all times, while at the same time presenting a long-wearing construction. Also, as the contact is good at all times there will be no small arcs or sparking as the roller moves from one point to the other.

It is evident various details and also other forms could be provided without departing from the spirit of the invention. For instance, the roller 13 can be made cylindrical and parallel to the shaft 5 provided it was driven by a gear wheel on the principle of the gear wheel shown in Figure 3. While the resilient or spring ring 10, the bearing member 12 and associated parts are desirable, it is evident that slight changes can be made without departing from the spirit of the invention, said changes, however, being limited to the details and not change in principle.

I claim—

1. A combined rheostat and potentiometer including a resistance element, a rolling contact member continually engaging therewith, and means for securing a positive rolling action of said contact member said means including a gear secured to said rolling contact member and a stationary gear member meshing therewith.

2. In a device of the character described, a resista ce member, a rolling contact member adapted to roll over said resistance element, a rack positioned substantially parallel with and substantially co-extensive with said resistance element, a gear wheel engaging said rack, said gear wheel being rigidly connected with said contact roller, and means for moving said contact roller and gear wheel whereby the gear wheel and rack will produce a positive drive for the contact roller without causing any disengagement thereof.

3. A device of the character described in cluding a body provided with a substantially annular rack, a substantially annular resistance element carried by said body, said resistance element having a contact surface substantially in line with the pitch of said rack, a substantially frusto-conical rolling contact positioned to connect with said resistance element, said roller contact having a gear meshing with said rack, and means including a shaft for moving said roller and gear wheel so that the roller will move over said resistance element, said roller having its apex locus at a point coincident with the center of said shaft and in line with the upper surface of said resistance element.

4. A device of the character described including a resistance element, a roller engaging said resistance element, the roller being provided with a gear wheel, a rack engaging said gear wheel, said rack being positioned with its pitch line in line with the contact surface of said resistance element, and means for moving said roller over said resistance element, said means causing the gear wheel to coact with said rack for positively rotating the roller and by reason of the fact that the pitch line of the gear wheel and the rack at the point of engagement is in the same plane as the contact surface of said resistance element causing a rotation of the roller without abrasion of the resistance element.

5. In a device of the character described, a substantially annular resistance element, a frusto-conical roller fitting against one surface of said resistance element, a rack arranged adjacent the resistance element, a gear wheel rigidly connected with said roller and continually meshing with said rack, a power shaft, and means including a resilient arm for pressing said roller against said resistance element and for moving the roller and gear wheel in a circular movement.

6. A device of the character described including a resistance element, a rack arranged alongside of the resistance element, a roller provided with a gear wheel, said roller being positioned to rest on the resistance element while the gear wheel engages said rack, said roller having a pair of grooves, a bearing member having a pair of arc-shaped ends straddling the roller at the grooved portions, said bearing member having an aperture arrangement substantially centrally thereof, an arm formed with an extension projecting through said aperture, and a pair of fingers pressing the bearing member against the roller, and means for moving said arm so that the roller will travel over said resistance.

7. A device of the character described, including a resistance element, a rack arranged alongside the resistance element, a roller provided with a gear wheel, said roller positioned to engage one surface of said resistance element while the gear wheel engages said rack, and means for moving said roller along said resistance element, the movement of said roller causing the gear wheel to positively rotate said roller so that there will be no scraping action or abrasion between the roller and the resistance element.

WILLIAM A. BRUNO.